United States Patent
Smith et al.

[19]

[11] Patent Number: 6,002,274
[45] Date of Patent: Dec. 14, 1999

[54] OVERSAMPLED STATE MACHINE FOR JITTER TOLERANT PULSE DETECTION

[75] Inventors: Michael D. Smith, Flower Mound; Michael R. Williamson, Dallas, both of Tex.

[73] Assignee: Dallas Semiconductor, Dallas, Tex.

[21] Appl. No.: 08/536,023

[22] Filed: Sep. 29, 1995

[51] Int. Cl.⁶ .................................................. H03K 17/16
[52] U.S. Cl. ............................ 327/19; 327/18; 327/44; 327/407
[58] Field of Search ........................ 327/18, 19, 23–30, 327/41, 43, 45–47, 49, 165, 166, 254, 255, 256, 94, 407

[56] References Cited

U.S. PATENT DOCUMENTS

| | | | |
|---|---|---|---|
| 3,641,366 | 2/1972 | Fujimoto ................................. | 307/251 |
| 3,835,404 | 9/1974 | Nakamura et al. ..................... | 329/104 |
| 4,308,472 | 12/1981 | McLaughlin ............................. | 327/18 |
| 4,516,250 | 5/1985 | Grimes ..................................... | 375/82 |
| 4,577,335 | 3/1986 | Wong et al. ............................. | 375/86 |
| 4,805,198 | 2/1989 | Stern et al. ............................. | 375/118 |
| 4,942,365 | 7/1990 | Satterwhite ............................. | 327/47 |
| 5,018,169 | 5/1991 | Wong et al. ............................. | 375/119 |
| 5,059,924 | 10/1991 | JenningsCheck ......................... | 331/1 |
| 5,087,828 | 2/1992 | Sato et al. ............................... | 327/24 |
| 5,359,631 | 10/1994 | Behrens et al. ......................... | 375/120 |
| 5,381,455 | 1/1995 | O Vens et al. ........................... | 377/67 |
| 5,408,192 | 4/1995 | Bailey ..................................... | 327/254 |
| 5,416,432 | 5/1995 | Lewis et al. ............................. | 327/94 |
| 5,530,383 | 6/1996 | May ......................................... | 327/18 |

FOREIGN PATENT DOCUMENTS

| | | | |
|---|---|---|---|
| 6125254 | 5/1994 | Japan ..................................... | 327/26 |
| 748843 | 7/1980 | U.S.S.R. ................................. | 327/18 |

*Primary Examiner*—Timothy P. Callahan
*Assistant Examiner*—T.T Lam
*Attorney, Agent, or Firm*—Jenkens & Gilchrist

[57] ABSTRACT

A transmission line sampling circuit for a T1 line is disclosed. A multi phase oscillator is connected to a plurality of state machines which are connected in parallel to a transmission line. The use of a plurality of state machines to sample the transmission line effectively increases the sample rate of the transmission line beyond that which can ordinarily be supported by a single phase oscillator running at the same frequency of the multi phase oscillator. The outputs of the plurality of state machines are provided to an arbitrator and to a MUX wherein the arbitrator decides which of the four state machines outputs should be switched through the MUX and produced transmitted on an output line.

8 Claims, 2 Drawing Sheets

OVERSAMPLED STATE MACHINE FOR JITTER TOLERANT PULSE DETECTION

PARTIAL WAVER OF COPYRIGHT PROTECTION

A portion of the disclosure of this patent document contains material which is subject to copyright protection. The copyright owner has no objection to the facsimile reproduction by any one of the patent disclosure, as it appears in the United States Patent and Trademark office patent files or records, but otherwise reserves all copyright rights whatsoever.

FIELD OF THE INVENTION

This invention relates to digital transmission line interface circuits, and more particularly, to jitter attenuator and data reconstruction circuits used in communications.

CROSS-REFERENCE TO RELATED APPLICATIONS

This application is related to the following U.S. Patent Applications:

| Ser. No. | TITLE | INVENTOR(S) |
| --- | --- | --- |
| (20661/446) 08/536,897. | Tunable Tone Control Circuit and a Device and Method for Tuning the RC Constants | Whiteside |
| (20661/447) U.S. Pat. No. 5,631,584 | Differential Cross Coupled Peak Detector | Whiteside |
| (20661/449) U.S. Pat. No. 5,642,079 | Amplifier with pole/ Zero Compensation | Whiteside |
| (20661/458) 08/536,906 | Sample Point Adjustment | Smith et al. |
| (20661/451) 08/536,875 | Ones Density Monitor | Smith |

All of the related applications are filed on even date herewith, are assigned to the assignee of the present invention, and are hereby incorporated herein in their entirety by this reference thereto.

BACKGROUND OF THE INVENTION

Communications over digital lines and other media often use communication protocols that require synchronized data transmission. However, even synchronously transmitted digital data over lines experience timing shifts or phase changes during the transmission. Such timing shifts, known as jitter, can result in data lags which in length, can be anywhere from a fraction of a pulse to several pulse periods. Because of these delays, any attempt to read data at the expected or "synchronized" arrival time may result in errors. Accordingly, different approaches have been followed to determine the arrival of a block of data.

One approach has been to utilize digital phase lock loop methods to synchronize the data sampling or reading with the data arrival. However, one drawback of utilizing phase lock loop (PLL) methods is that the PLL circuits are complex and, in an integrated circuit, can consume an undesirable amount of power and circuit space. PLL circuits are generally constructed with feedback loops which can become unstable. PLL systems also increase the device cost. Accordingly, a simpler system which costs less and utilizes less power and circuitry is desirable.

Another approach has been to utilize traditional L.C. tanks. However, LC tanks are known to introduce jitter and exhibit poor stability over temperature and time.

The T1 transmission standard uses an "alternate-mark-inversion" (AMI) format. The AMI format consists of "0" bits being represented by the absence of a pulse while "1" bits are represented by pulses of alternating polarity. The time average signal voltage of T1 data transmissions, therefore, is zero volts. Additionally, the T1 standard frequency for data transmission is 1.544 Megabits per second. Because a T1 line carries twenty four channels plus one framing bit, each channel transmits at a rate of 64 kilobits per second. Additionally, T1 transmission is based on twisted pair wiring, with separate pairs being used for the transmit and receive sides of the T1 line. T1 lines also require a repeater circuit at least every 6,000 feet to regenerate the signals which are attenuated and phase distorted.

One known problem of digital transmissions at such frequencies is that line inductance and line capacitance cause significant pulse distortion and attenuation. Because a pulse is essentially a signal having a large multitude of varying frequency components, the line inductance and capacitance distort the component signals by phase shifting and attenuating the frequency components in differing amounts. The overall result is to "smear" the original pulse received at the input end of the cable to produce an attenuated signal having ripple waves superimposed thereon. Accordingly, the phases of these signals must be realigned and the attenuation must be compensated to approximately reconstruct the initial pulse.

After a pulse is reconstructed, another problem is to determine that a pulse has arrived so that the optimal sample point of the pulses of a digital stream may be determined. In a PLL system, the timing of the pulses are known because of the synchronized characteristics of phase lock loop. However, as discussed before, it would be advantageous to utilize a circuit simpler than a PLL. Accordingly, a line may be periodically sampled to determine the presence of the first pulse of a data stream. If pulses were received in an ideal shape without jitter, then the sample rate could be no faster than the actual pulse rate. However, because of pulse distortion and jitter, it is desirable to sample a digital stream for data reading purposes at or near the middle of the pulse. However, to sample in the middle of a pulse, the presence of a pulse must be detected immediately after arrival of the leading edge of the pulse. Thus, if the timing of a pulse is not known exactly, the amount of time after arrival of a leading edge should be minimized by increasing the sample rate of a transmission line.

The sample rate of the oscillator must be several times faster than the signal it is tracking to properly track the instantaneous jitter of the desired signal. For example, the T1 specification requires that 0.4 unit intervals (UI) of jitter modulating at 100 KHz be tolerated while properly determining if a 1 or a 0 has been received. At the T1 rate of 1.544 megabits/sec., a 32x oversampling clock will sufficiently track the required jitter to meet the specification. Thus, what is needed is a stable system which increases the sample rate to satisfy the T1 standard.

SUMMARY OF THE INVENTION

At least two state machines connected to a transmission line are driven by different phases of a multi phase oscillator to cause a line to be sampled for pulses at an equivalent rate higher than that of the multi phase oscillator.

In one embodiment of the invention, a two-phase oscillator is connected to two 16x state machines which results in a line being sampled 32x in a pulse period.

In another embodiment of the invention, a four-phase oscillator is connected to four 8x state machines. Once again, the line is sampled 32x in a pulse period.

In yet another embodiment of the invention, a multi phase oscillator operating at 24.704 MHz is connected to four 16x state machines which results in the 1.544 MHz transmission line being sampled 64x in one pulse period.

In another embodiment, an arbitrator is connected to the plurality of state machines to receive a clock signal and a data value from each state machine. The arbitrator then sends commands to a MUX to output the data stream from the first state machine that detected a valid pulse.

BRIEF DESCRIPTION OF THE DRAWINGS

For a more complete understanding of the present invention and the objects and advantages thereof, reference may be made to the following descriptions taken in conjunction with the accompanying drawings in which.

DESCRIPTION OF THE PRESENTLY PREFERRED EXEMPLARY EMBODIMENTS

Figure 1:
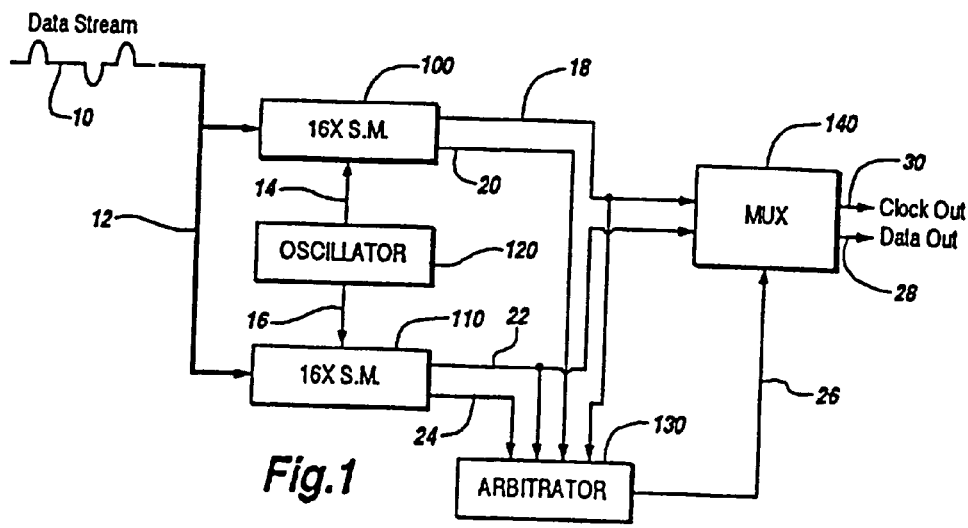
FIG. 1 is a block diagram of one embodiment of the invention.

Referring now to FIG. 1, there is shown a block diagram of one embodiment of the invention. As may be seen, this embodiment of the invention is comprised of two state machines 100 and 110 for sampling a transmission line to detect the presence of a data stream 10 pulse with an oscillator 120 driving each of the two state machines 100 and 110. Additionally, the embodiment of FIG. 1 comprises an arbitrator 130 and a multiplexer 140 for outputting the signals provided by one of the state machines 100 and 110. Each state machine 100 and 110 is adapted to sample transmission line 12 at a rate of 16 times per pulse period.

Multi phase oscillator 120 produces a clock pulse having a phase $\phi 1$ over line 14 which is connected to and used to drive state machine 100. Similarly, oscillator 120 produces a clock pulse having a phase $\phi 2$ over line 16 to state machine 110. In the embodiment of FIG. 1, $\phi 1$ and $\phi 2$ are 180° out of phase. Thus, the result of an embodiment of the invention having two state machines, each being driven by a different phase of a multi phase oscillator, is to double the sample rate of transmission line 12 and thereby to decrease the amount of time that lapses after a leading edge of a pulse is received.

As may be seen in FIG. 1, state machine 100 also has two output lines 18 and 20. Line 18, which is connected to arbitrator 130 and MUX 140 carries signals reflective of pulses and zeros determined to exist in data stream 10 as sampled from transmission line 12. Line 20, which connects state machine 110 to arbitrator 130 merely carries a data signal which indicates that a valid pulse has been detected.

State machine 110 is similarly connected to the arbitrator 130 and MUX 140. Specifically, line 22 which carries the sampled data values, is connected to arbitrator 130 and MUX 140. Line 24, which carries a data valid signal, is connected solely to arbitrator 130.

Arbitrator 130 continuously determines which of the two state machines 100 and 110 first determined the presence of a valid pulse being transmitted over transmission line 12. After determining which one of the two state machines 100 or 110 first received a valid pulse, arbitrator 130 transmits a signal over line 26 to MUX 140 to control which of the two data input lines 18 or 22 from state machines 100 or 110, respectively, should be switched the output line 30, which becomes the output clock that was used to sample the data stream 12. The data output 28 is the result of sampling the input data stream 12 and is synchronous with clock out on line 30.

Figure 2:
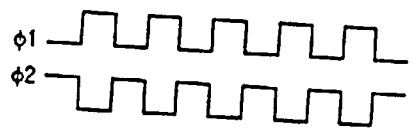
FIG. 2 is a timing diagram illustrating the relationship between the multi phase clock pulses.

Referring now to FIG. 2, there is shown a timing diagram illustrating the relationship of the clock pulses produced by oscillator 120 over lines 14 and 16. As was stated before, the clock pulses on the two lines 14 and 16 each have a phase $\phi 1$ and $\phi 2$, respectively, which are 180° out of phase. Accordingly, because state machines 100 and 110 are driven by these multi phase clock pulses from oscillator 120, the transmission line 12 is sampled twice as frequently per pulse period in comparison to either one of the two state machines 100 or 110 (See FIG. 1). By way of example, if oscillator 120 produced clock pulses at a 24.704 MHz rate and the input data stream 12 were running at 1.544 MHz, the embodiment of FIG. 1 would achieve a 32x sample rate, a rate that is faster than the oscillator frequency. Thus, this configuration does not require more complicated and faster oscillators.

Figure 3:
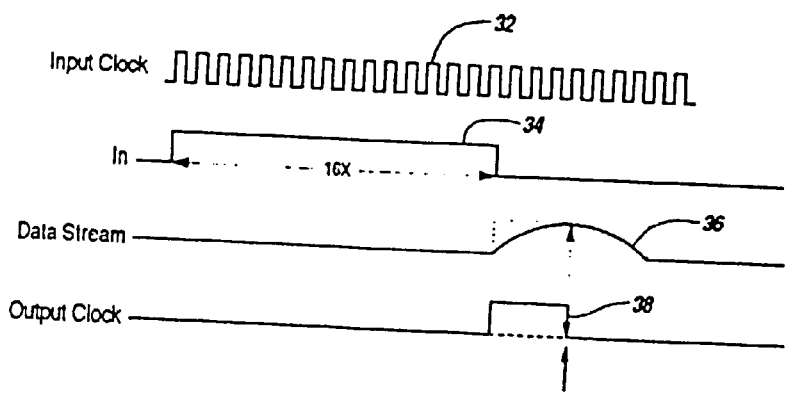
FIG. 3 is a timing diagram illustrating the relationship between various signals.

Referring now to FIG. 3, there is shown a timing diagram illustrating the relationship between various signals. Specifically, signal 32 which represents the sampling rate of either state machine 100 or state machine 110. Signal 34, represents the average rate of the transmission line. There are 16 pulses in signal 32 which correspond to the one pulse of signal 34. Signal 36 represents a reconstructed pulse that has been received from the transmission line. Signal 38 of FIG. 3 represents the optimum sample point for the detected pulse of signal 36.

Figure 4:
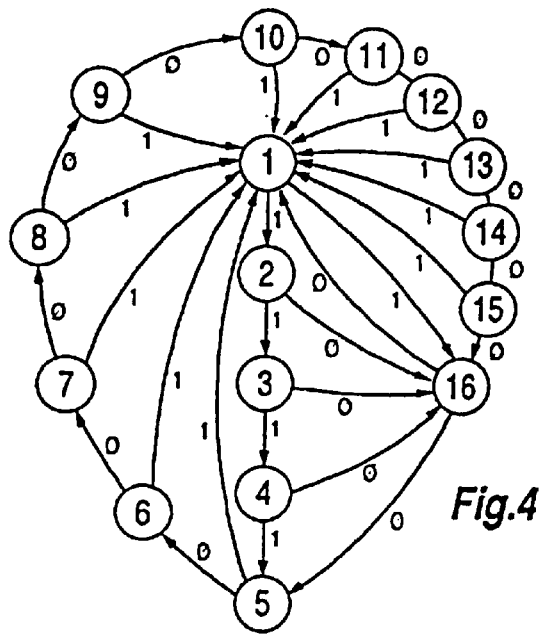
FIG. 4 is a state diagram illustrating pulse detection logic.

Referring now to FIG. 4, there is shown a state diagram illustrating the pulse detection logic of each of state machines 100 and 110. Starting with state 1, which reflects that a signal was detected by the state machine on the previous sample, the machine will proceed to state 2 if a pulse is detected on the next sample and to state 16 if no pulse is detected on the next sample. Similarly, the state machine will proceed from state 2 to states 3, 4 and 5 so long as a pulse is detected on each of the subsequent samples of the state machine. According to this embodiment of the invention, once state 4 has been reached, the state machine concludes that a valid pulse is present and that the previously detected pulses are not a result of a noise spike on the line.

Once the state machine reaches state 5, if it detects the lack of a pulse or a zero, then it transitions to state 6. So long as the state machine continues to detect zeros, it will continue to transition around to the states forming the perimeter of the state diagram, namely, states 7–16 and then back to state 5. At any of these states, however, once a pulse is detected, the state machine transitions back to state 1.

As may be seen, then, it is the steps from states 1 through 4 that allow the machine to determine whether it is detecting the presence of a pulse or of a noise spike. Additionally, as the state machine continues to detect the presence of a pulse, the state machine stays within states 1, 2, 3, 4 or 5.

Referring again to FIG. 1, one may see that state machine 100 indicates the presence of a pulse to arbitrator 130 over line 20 while state machine 110 indicates the presence of a pulse to arbitrator 130 over line 24. These signals are transmitted over lines 20 and 24 whenever the state machine of FIG. 4 reaches state 4. Thus, by monitoring lines 20 and 24, arbitrator 130 can determine which state machine 100 or 110 was first to reach state 4 and conclude that a valid pulse has been transmitted on line 12.

Figure 5:
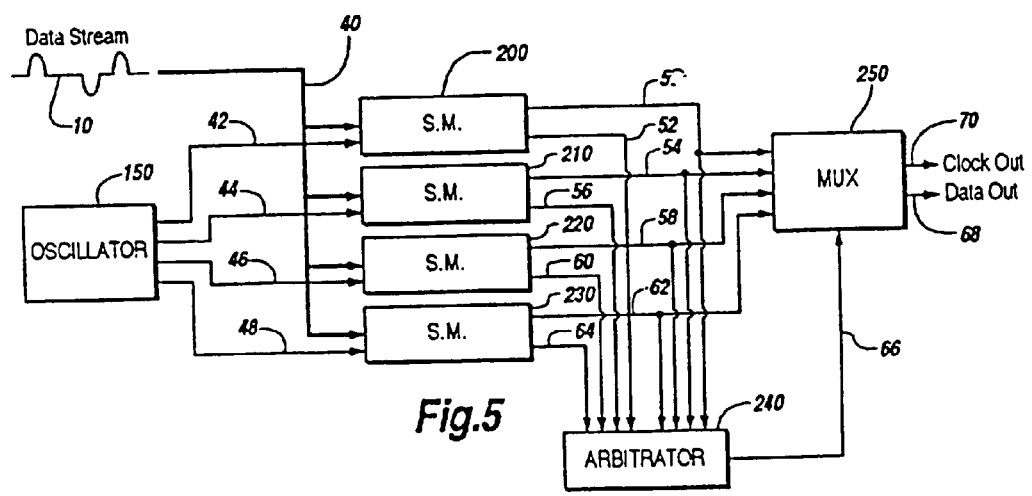
FIG. 5 is a block diagram of an alternate embodiment of the invention.

Referring now to FIG. 5, there is shown a block diagram of an alternate embodiment of the invention. As may be seen, oscillator 150 produces four clock pulses, each being either 90°, 180°, or 270° out of phase with the other three pulses. Each of these clock pulses are sent to state machines 200, 210, 220 and 230 over lines 42, 44, 46 and 48, respectively. Each of these state machines, 200, 210, 220 and 230 are connected to transmission line 40 to receive data stream 15. As may be seen, the state machines 200, 210, 220 and 230 produce data signals on lines 50, 54, 58, and 62 to the arbitrator 240 and MUX 250. The state machines 200, 210, 220 and 230 also provide a data valid pulse on lines 52, 56, 60 and 64 to the arbitrator 240. The arbitrator 240, then, produces an output signal to MUX 250 to control the switching of MUX 250 wherein one of the four data lines, namely, 50, 54, 58 or 62, is switched to data output line 68.

As may be seen, the operation of this embodiment is similar to the operation of the embodiment of FIG. 1 except for the number of phases of the output clock of the oscillator and the number of state machines being run out of phase relative to each other to sample the transmission line 40. Thus, by way of example, if each state machine samples eight times per pulse period, the transmission line is sampled 32x as before.

CONCLUSION

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A pulse detecting system, comprising:
 a first state machine having a first clock input, a first data stream input connected to a transmission line carrying a data stream, and a first output for outputting a signal reflecting the presence of a data pulse in said data stream on said transmission line, said first state machine having at least 4 states;
 a second state machine having a second clock input, a second data stream input connected to said transmission line carrying said data stream, and a second output for outputting a signal reflecting the presence of said data pulse in said data stream on said transmission line, said second state machine having at least 4 states;
 a clock providing a first clock signal with a first phase connected to said first clock input of said first state machine and a second clock signal having a second phase connected to said second clock input of said second state machine; and
 means for arbitrating, connected to the said first and second outputs, said arbitrating means determining which state machine first transmitted a signal reflecting the presence of said data pulse, said arbitrating means signaling a MUX based upon such determination.

2. The pulse detecting system according to claim 1 wherein said first state machine and said second state machine sample said transmission line carrying said data stream at least eight times per data stream pulse.

3. The pulse detecting system according to claim 1 wherein said first state machine and said second state machine sample said transmission line carrying said data stream at least sixteen times per data stream pulse.

4. The pulse detecting system according to claim 1 wherein said clock provides at least said first clock signal having a frequency of 24.704 MHz.

5. A pulse detecting system, comprising:
 a first state machine having a first clock input for a first clock pulse, a first data stream input connected to a transmission line for carrying a data stream, and a first output for outputting a signal reflecting the presence of a data pulse in said data stream on said transmission line, said first state machine having at least four states;
 a second state machine having a second clock input for a second clock pulse, a second data stream input connected to said transmission line for carrying said data stream, and a second output for outputting a signal reflecting the presence of said data pulse in said data stream on said transmission line;
 a third state machine having a third clock input for a third clock pulse, a third data stream input connected to said transmission line for carrying said data stream, and a third output for outputting a signal reflecting the presence of said data pulse in said data stream on said transmission line;
 a fourth state machine having a fourth clock input for a fourth clock pulse, a fourth data stream input connected to said transmission line for carrying said data stream, and a second output for outputting a signal reflecting the presence of said data pulse in said data stream on said transmission line;
 a clock providing said first clock pulse having a first phase to said first clock input, said second clock pulse having a second phase connected to said second clock input, said third clock pulse having a third phase to said third clock input, and said fourth clock pulse having a fourth phase to said fourth clock input; and
 means for arbitrating, connected to said first, said second, said thirds and said fourth outputs for determining which of said first state machine, said second state machine, said third state machine, and said fourth state machine first determined the presence of said data pulse in said data stream and for controlling a MUX based upon such determination.

6. The pulse detecting system of claim 1, wherein said first state machine and said second state machine each determine whether a valid data pulse exists when a fourth state has been reached.

7. The pulse detecting system of claim 1, wherein each of said first and second state machines determine whether said data pulse on said data stream is a noise spike.

8. The pulse detecting system of claim 5, wherein each of said second, third and fourth state machines each have at least four states.

* * * * *

UNITED STATES PATENT AND TRADEMARK OFFICE
CERTIFICATE OF CORRECTION

PATENT NO : 6,002,274
DATED : December 14, 1999
INVENTOR(S) : Smith, et al.

It is certified that error appears in the above-identified patent and that said Letters Patent are hereby corrected as shown below:

On the title page

[73] Assignee: Replace "Dallas Semiconductor" With --Dallas Semiconductor Corporation--

Column 6, line 46 Replace "thirds" With --third--

Signed and Sealed this

First Day of May, 2001

Attest:

NICHOLAS P. GODICI

Attesting Officer  Acting Director of the United States Patent and Trademark Office